United States Patent [19]

Simon

[11] 3,802,793

[45] Apr. 9, 1974

[54] BATTERY TOOL MEANS

[76] Inventor: Murray L. Simon, 1818 Cedar Rd., Elkins Park, Pa. 19117

[22] Filed: July 9, 1973

[21] Appl. No.: 377,603

Related U.S. Application Data

[63] Continuation of Ser. No. 160,403, July 7, 1971, abandoned.

[52] U.S. Cl................. 408/204, 408/211, 408/227, 15/105, 15/236 R
[51] Int. Cl...................... A47l 13/08, B23b 51/00
[58] Field of Search .......... 408/227, 228, 229, 199, 408/204, 211; 15/236 R, 105, 104.1, 104.2, 104.5

[56] References Cited
UNITED STATES PATENTS

| | | | |
|---|---|---|---|
| 2,562,136 | 7/1951 | Sullins................................ | 15/105 |
| 2,582,913 | 1/1952 | Pfefferle....................... | 30/346.58 X |
| 2,411,209 | 11/1946 | Hall et al....................... | 408/229 X |

FOREIGN PATENTS OR APPLICATIONS

| | | | |
|---|---|---|---|
| 704,161 | 2/1941 | Germany............................ | 408/227 |

Primary Examiner—Gil Weidenfeld
Attorney, Agent, or Firm—Jacob Trachtman

[57] ABSTRACT

A battery tool means providing a body having a central portion, a pair of oppositely extending arms, and a downwardly extended tapered portion, said tapered portion including a plurality of blade elements having extending side ends for reaming a smooth conical contact surface when inserted into and rotated in contact with the conical contact surface of a battery terminal. The arms of the body are each provided with a recess for receiving a battery pole, and a substantially cylindrical metal band removably received over the outer surface of the arm and having an edge providing a blade extending into the recess of the arm through a longitudinal opening providing a tapered edge for providing a smooth conical contact surface on the battery pole when the device is rotated.

11 Claims, 7 Drawing Figures

PATENTED APR 9 1974

3,802,793

INVENTOR.
MURRAY L. SIMON
BY
Jacob Trachtman

BATTERY TOOL MEANS

This is a continuation of my application Ser. No. 160,403, filed July 7, 1971 entitled Battery Tool Means and now abandoned.

The invention relates to a battery tool means of the type used for reaming the conical contact surface of a battery terminal and the positive and negative tapered poles of a battery to provide good electrical contact.

Heretofore, battery terminal reaming and smoothing tools have been provided which are expensive to manufacture. Such devices require precision machined elements and are assembled by use of threaded components and openings further increasing the cost and expense of assembly and manufacture. Since the machine elements and the cutting portions of such devices are too expensive to be disposable, they require periodic sharpening to maintain their usefulness.

It is therefore a primary object of the invention to provide a new and improved battery tool means which is inexpensive to manufacture and provides good durability.

Another object of the invention is to provide a new and improved battery tool means which does not require machined cutting elements and has removable blades which may readily be replaced.

Another object of the invention is to provide a new and improved battery tool means which is light in weight, sturdy in construction and operates to provide precision sizing and smoothing of battery contacts and poles.

Another object of the invention to provide a new and improved battery tool means which requires a minimum of assembly operations.

The above objects of the invention are achieved by providing a battery tool means having a body with a central portion, a pair of oppositely extending arms and a downwardly extending tapered portion. The tapered portion includes a plurality of blade elements having extending side ends for reaming a smooth conical contact surface when inserted into and rotated in contact with the conical contact surface of a female battery terminal. The body is formed of plastic material and the tapered portion provided with metal blades embedded in the plastic material with tapered side ends extending therefrom. Each of the extending side ends has a leading cutting edge and a trailing edge, the plastic material being recessed from the leading edge and substantially even with the trailing edge of the blades. The side ends of the blades extending from the plastic material are angled so that the leading edge extend beyond the trailing edges and provides a dragging or wiping action when the tapered portion is rotated in a given direction for reaming the conical contact surface of a battery terminal.

The arms of the body each have a recess providing a wall with inner and outer surfaces of circular cross-section and a longitudinal opening in the wall communicating with the recess. A substantially cylindrical band is removably receivable over the outer surface of each of said arms and has an edge providing a blade extending into the recess of the arm through the longitudinal opening. The blade of the band provides a tapered edge within the recess so that the edge extends further into the recess in the direction along the longitudinal opening towards the central portion of the body, whereby when a battery pole is received within the recess of the arm and the tool means is rotated about the longitudinal axis of the arm, the tapered edge of the blade forms a smooth conical contact surface of the battery pole.

The foregoing and other object of the invention will become more apparent as the following detailed description is read in conjunction with the drawings, in which.

Figure 1:
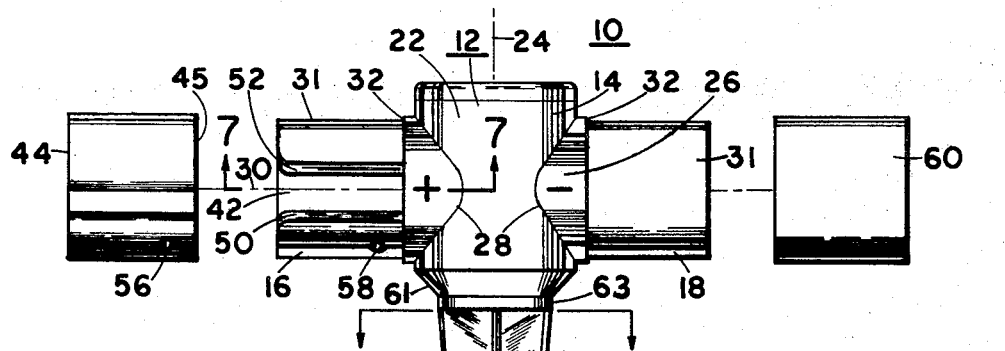
FIG. 1 is a front elevational view of a battery tool means embodying the invention showing the cylindrical bands in their removed condition.
Figure 3:
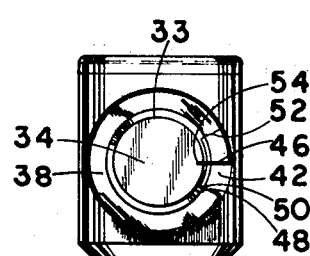
Figure 5:
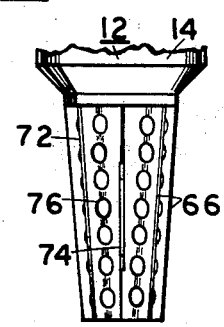
Figure 4:
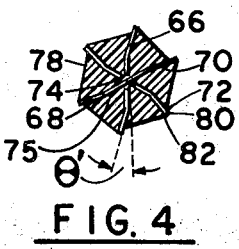
Figure 6:
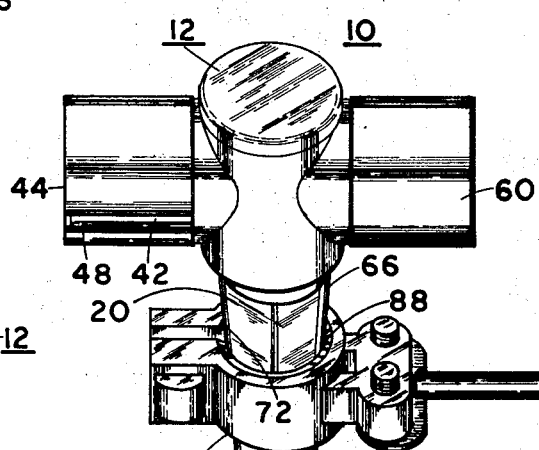
Figure 7:
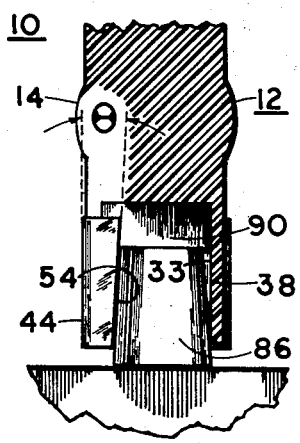

FIG. 3 is a left side elevational view of the tool means with the bottom portion broken away, FIG. 4 is a sectional view taken on the line 4—4 in FIG. 1, FIG. 5 is a fragmentary view showing the bottom portion of said tool means with the plastic material removed and the blade elements exposed, FIG. 6 is a perspective view of the tool means illustrating its application to a battery terminal, and FIG. 7 is a partial sectional view taken on the line 7—7 of FIG. 1 illustrating its application to a battery pole.

Like reference numerals designate like parts throughout the several views.

Refer to the figures which illustrate a battery tool means 10 embodying the invention comprising a body 12 having a central portion 14, a pair of opposite horizontally extending arms 16 and 18, and a downwardly extending tapered portion 20. The body 12 is preferably made of a plastic material which can be formed in one operation using a dye means or other techniques well known in the art.

The central portion 14 of the body 12, as illustrated in the figures, may be provided with a first cylindrical surface 22 having a vertical axis of symmetry 24, and a second cylindrical surface 26 intersecting the first surface 22 along lines 28 and having a horizontal axis of symmetry 30 intersecting the vertical axis of symmetry 24. The arms 16 and 18 which extend respectively on opposite sides of the body 12 about the symmetrical axis 30, each have an outer cylindrical surface 31 of circular cross-section of smaller diameter than the cylindrical surface 26 of the central body 14 to form raised shoulders 32 at their junction with the central portion 14 of the body 12. Each of the arms 16 and 18 is provided with a respective recess 34, 36, providing walls 38, 40 each with an inner surface 33 which is of circular cross-section and concentric with the outer surfaces 31 of their walls 38, 40. The arm 16 is provided with a longitudinal opening 42 in its wall 38 extending in the direction of the axis 30 and communicating with its recess 34, while the arm 18 is provided with a similar opening 43 in its wall 40 on the side opposite to the opening 42 in the arm 16.

A substantially cylindrically formed band 44 preferably of spring steel is provided for being slidably received over the outer surface 31 of the arm 16 by movement along the aixs 30 in the direction towards the central portion 14 of the body 12. As clearly seen in FIG. 3 the band 44 is provided with opposite edges 46, 48 which are received into the opening 42 of the arm 16 and extend therethrough inwardly toward the recess. The edge 48 which is shorter than the edge 46 engages the longitudinal extending edge 50 of the opening 42 while the edge 46 which is spaced from the opposite edges 50 and 52 of the opening 42 provides a blade with a tapered end 54. The blade end 54 extends inwardly toward the axis 30 to a greater extent as it extends in the axial direction along the longitudinal opening 42 towards the central portion 14 of the body 12 to provide an angle θ as clearly shown in FIG. 7.

The band 44 is maintained in position on the arm 16 by the detent means comprising the depressed region 56 in the band, which is received into the cavity 58 in the arm 16 proximate to the central portion 14 of the body 12. The end edge 45 of the band 44 when in position, also abuts the shoulder 32 limiting the travel of the band 44 and providing a stop therefore.

The arm 18 is similar to the arm 16, except that its recess 36 may be of a smaller diameter than the recess 34 in the arm 16 and its band 60 provides a blade 62 with an edge 64 extending closer to the axis 30 than the edge 54 of the band 44.

Figure 2:
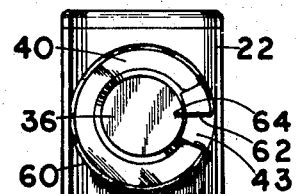
FIG. 2 is a right side elevational view of the tool means.

The tapered portion 20 of the tool means 10 is joined with the central portion 14 by an intermediate cylindrical section 63 and a conical section 61. The tapered portion 20 comprises a plurality of blade elements 66 each of which has opposite side ends 68, 70 with blade edges 72. The blade edges 72 provide a tapered form as clearly seen in FIG. 2 wherein an angle θ is formed with the vertical axis 24. Each of the blade elements 66 is provided with one or more slots 74 in their central region 75 intermediate the side ends 68, 70 whereby each of the blades are interengaged in the arrangement shown in FIGS. 4 and 5. The blade elements are provided with a plurality of openings 76 therethrough through which the plastic material 78 extends firmly positioning and retaining the blades in their predetermined relationship. Of course, the plastic material 78 may be formed at the same time that the remainder of the body 14 is being made during a single casting or plastic forming operation with the blade elements 66 in their predetermined positions.

As illustrated in FIG. 4, the blade elements 66 are provided with a central region 75 which extend in a radial direction while the side ends 68, 70 extend at an angle θ' thereto as seen in FIG. 4. With this arrangement the leading edge 80 of each of the side ends of the blade elements 66 extends beyond the trailing edge 82 when measured from the vertical axis 24. The plastic material 78 is recessed from the edge 80 providing clearance therefor, while the plastic material 78 extends from directly beyond the trailing edge 82 to provide support therefor.

The battery tool means 10 may be used for providing smooth contact surfaces for a female battery terminal 84 of the clamping type which is made of a conducting metal material such as lead for engagement with a battery pole 86. The male terminal or pole 86 is made of a conducting material such as lead and is usually provided with a standard taper which is designated by the angle θ in FIG. 7 and complements the similarly tapered conical contact surface provided by a female terminal 84.

In operation the tapered portion 20 of the means 10 is inserted into the opening 88 of the terminal 84 with the larger diameter of the opening facing upward as illustrated in FIG. 6, after which the tool 10 which is manually grasped by the central portion 14 and the extending arms 16 and 18 forming a handle and rotated. The tool means 10 is rotated in the counterclockwise direction when referred to FIG. 4, so that the side ends 68, 70 of the blade elements 66 are wiped or dragged along the surface which is to be smoothed. The leading edge 80 acts to ream, cut or scrape sufficient material from the surface of the terminal 84 to provide a highly smooth and polished contact surface. The material removed during the cutting operation is received into the clearance area provided between the blade elements by the recessed plastic surface where it may be retained or fall downwardly away from the tool and terminal.

Next, the battery poles 86 are prepared by being received into the cavity 34 of the arm 16. The tool 10 is then rotated in a similar manner, by using the central portion 14 and the extending portion 20 as a handle, for cutting a smooth polished surface on the male battery pole 86. The edge 54 of the blade provided by the band 44 is also angled so as to provide a conical mating surface for the terminal 84 of a configuration similar to that of the female terminal contact surface as indicated by the same angle θ in FIG. 7.

The tool 10 is rotated in the counterclock direction when viewed from FIG. 3 whereby the extending edge 54 smooths the conical contact surface of the pole as desired with the pole 86 moving further into the opening 34 as material is shaved or cut therefrom. Sufficient clearance at the end 90 of the recess 34 is provided for such movement. The inwardly extending edge 48 which grips the longitudinal edge 50 of the opening 42 prevents rotational displacement of the band 44, while allowing the easy removal and replacement of the band when required.

In order to distinguish between positive and negative poles of the battery, one of the terminals is usually made smaller than the other. The arm 18 with the band 16 having an edge 64 extending closer to the axis 30 is provided for processing the smaller battery pole while the other arm and its band are utilized for the larger pole. The elongated portion 20 is sufficiently long to provide the variation in size required for processing the female battery terminals having the larger and smaller openings to complement the respective battery poles.

In view of the above description, it is noted that the invention provides a device which may be easily and simply constructed and is of great utility. The device is inexpensive to manufacture and may have its bands 44 and 60 easily removed and replaced when required. The utilization of the tapered blade elements in the extending portion 20 with the side ends angled provides an efficient and inexpensive cutting tool for smoothing the battery terminals while retaining the required battery terminal and pole configurations.

While the invention has been described and illustrated with reference to a specific embodiment, it will be understood that the invention is capable in various modifications and applications, not departing essentially from the spirit thereof, which will become apparent to those skilled in the art.

What is claimed is:

1. A battery tool means providing a body of plastic material having a top portion, and a tapered portion extending downwardly about a vertical central axis; and a plurality of at least three blade elements angularly spaced and substantially embedded in said tapered portion, said blade elements having side ends extending from said axis to beyond said tapered portion and terminating on a conical surface for reaming a smooth conical contact surface when inserted into and rotated in contact with the conical contact surface of a battery terminal.

2. The means of claim 1 in which the top portion of said body includes a central portion and a pair of oppositely extending arms.

3. The means of claim 2 in which said blade elements comprise metal blades with extending tapered side ends.

4. The means of claim 3 in which each of the extending side ends has a leading cutting edge and a trailing edge, said plastic material of said tapered portion of said body being recessed from said leading edge and being substantially even with said trailing edge of said blades.

5. The means of claim 4 in which the side ends of the blades extending from said plastic material of said tapered portion of said body are angled so that the leading edges extend beyond the trailing edges.

6. The means of claim 5 in which said blades each comprise a pair of side ends extending at opposite sides of said tapered portion of said body at an angle projecting the leading edges beyond the trailing edges of said blades and providing a dragging action when said tapered portion is rotated in a given direction for reaming the conical contact surface of a battery terminal.

7. The means of claim 6 in which said blades each have a central portion intermediate their opposite side portions, at least certain of said blades being provided with slits in their intermediate portions, and said blades being interengaged at their central portions by respectively extending through said slits, said blades being provided with a plurality of openings therethrough with plastic material extended between and through the openings of said blades for imbedding and retaining said blades in fixed relationship with their side ends extending therefrom.

8. The means of claim 2 in which at least one of the arms of said body has a recess providing a wall with inner and outer surfaces of circular cross-section and a longitudinal opening communicating with said recess, and substantially cylindrical metal band removably receivable over the outer surface of said arm and having an edge providing a blade extending into the recess of said arm through said longitudinal opening, the blade of said band providing a tapered end within said recess so that said end extends further into said recess in the direction along said longitudinal opening toward the central portion of said body, whereby when a battery pole is received within the recess of said arm and the means is rotated about a longitudinally axis of said arm, the tapered edge of said blade forms a smooth conical contact surface on said battery pole.

9. The means of claim 8 in which said band is removable from said arm by sliding movement in the longitudinal direction of said opening away from the central portion of said body, and said blade and arm are provided with detent means for maintaining said blade in position on said arm.

10. The means of claim 8 in which said band is provided with a second edge opposite the aforesaid edge extending inwardly and along the longitudinal edge of said arm and in engagement therewith for retaining said band against rotational displacement on said arm during operation of said tool means.

11. The means of claim 8 in which said arms are each provided with bands respectively sized and adapted to receive and smooth battery poles of different respective sizes.

* * * * *

UNITED STATES PATENT OFFICE
CERTIFICATE OF CORRECTION

Patent No. 3,802,793　　　　　　　　　Dated April 9, 1974

Inventor(s) Murray L. Simon

It is certified that error appears in the above-identified patent and that said Letters Patent are hereby corrected as shown below:

On the cover sheet [76] "1818 Cedar Rd." should read -- 8118 Cedar Rd. --.

Signed and sealed this 24th day of September 1974.

(SEAL)
Attest:

McCOY M. GIBSON JR.　　　　　　　　C. MARSHALL DANN
Attesting Officer　　　　　　　　　Commissioner of Patents